United States Patent [19]

Kitami

[11] Patent Number: 4,723,236

[45] Date of Patent: Feb. 2, 1988

[54] MECHANISM FOR CONTROLLING MOVEMENTS OF CASSETTE, CASSETTE HOLDER AND HEAD PLATE IN TAPE CASSETTE PLAYER

[75] Inventor: Taiji Kitami, Chiba, Japan

[73] Assignee: Sony Corporation, Tokyo, Japan

[21] Appl. No.: 671,326

[22] Filed: Nov. 14, 1984

[30] Foreign Application Priority Data

Nov. 18, 1983 [JP] Japan .................................. 58-216045

[51] Int. Cl.⁴ ...................... G11B 5/008; G11B 15/00; G11B 17/00; G11B 5/54
[52] U.S. Cl. .................................. 360/93; 360/105; 360/96.6; 360/96.3; 360/96.5
[58] Field of Search .................................. 360/90-93, 360/96.1-96.6, 74.1, 137, 69, 105

[56] References Cited

U.S. PATENT DOCUMENTS

| | | | |
|---|---|---|---|
| 4,238,808 | 12/1980 | Tomita | 360/96.1 |
| 4,313,142 | 1/1982 | Uchida | 360/105 X |
| 4,374,401 | 2/1983 | Takai | 360/96.5 X |
| 4,470,087 | 9/1984 | Sakamoto | 360/105 X |
| 4,507,694 | 3/1985 | Hosono et al. | 360/90 X |
| 4,612,591 | 9/1986 | Tanaka et al. | 30/96.5 |

FOREIGN PATENT DOCUMENTS

| | | | |
|---|---|---|---|
| 59-60751 | 4/1984 | Japan | 360/96.5 |
| 2125608 | 3/1984 | United Kingdom | 360/96.3 |

Primary Examiner—A. J. Heinz
Assistant Examiner—Alfonso Garcia
Attorney, Agent, or Firm—Lewis H. Eslinger; Alvin Sinderbrand

[57] ABSTRACT

An automatic control mechanism for a tape cassette player comprises a control motor selectively rotatable in first and second directions, a cassette holder movable between a cassette load/eject position and a cassette operating position, and a head plate movable to any of a plurality of positions respectively enabling operation of the cassette player in a plurality of modes. First, second and third cams are mounted for reversible rotation by the motor. A first operating arm controlled by the first cam effects reversible movement of a tape cassette within the cassette holder between an ejected position and a loaded position. A second operating arm controlled by the second cam effects reversible movement of the cassette holder between the cassette load/eject position and the cassette operating position. A third operating arm controlled by the third cam effects reversible movement of the head plate to a selected one of the mode-enabling positions. The first, second and third operating arms are moved in a sequence which depends on the direction of rotation of the motor.

5 Claims, 5 Drawing Figures

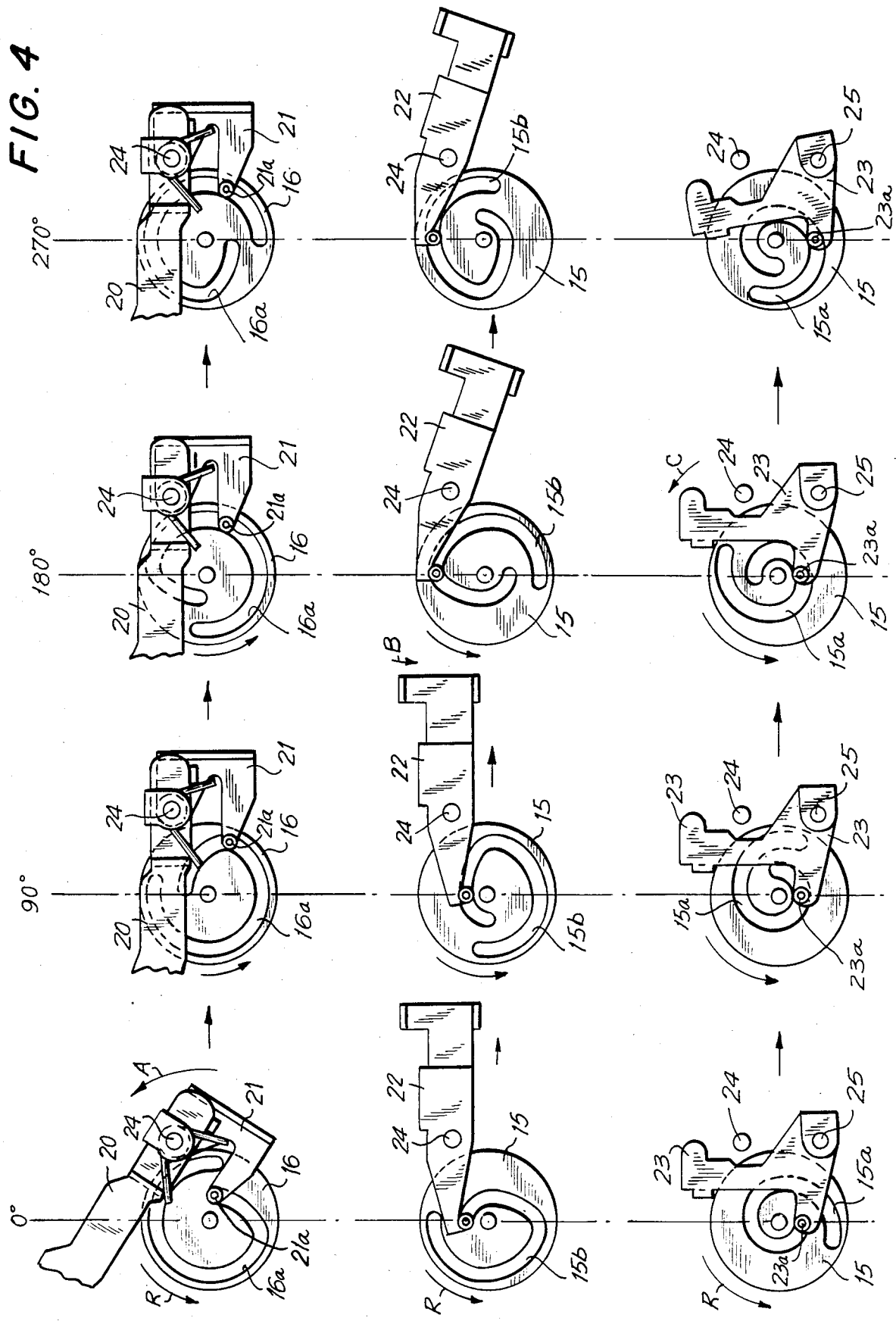

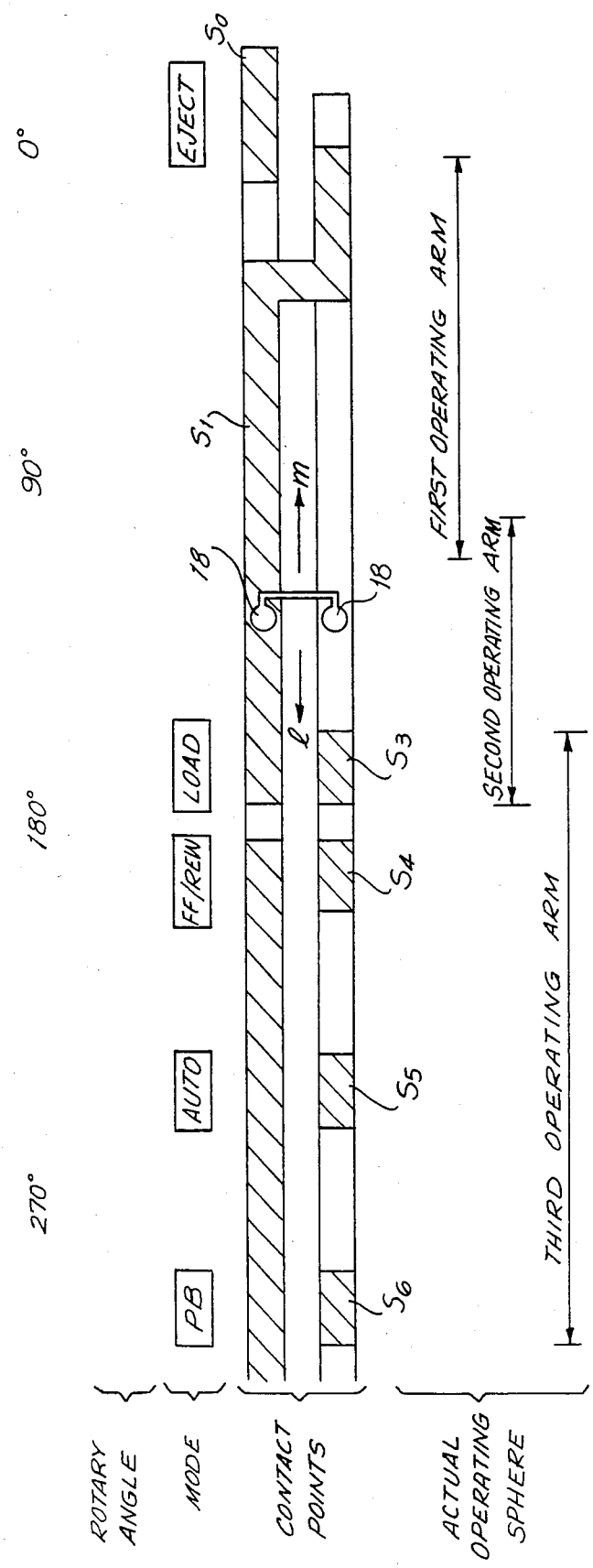

MECHANISM FOR CONTROLLING MOVEMENTS OF CASSETTE, CASSETTE HOLDER AND HEAD PLATE IN TAPE CASSETTE PLAYER

BACKGROUND OF THE INVENTION

1. Field of the Invention

This invention relates to tape cassette players such as car stereos and video tape recorders and, more particularly, to a novel and highly-effective automatic mechanism for reversibly moving a tape cassette between ejected, loaded and operating positions and for changing the position of a head base plate or other movable components in order to enable different modes of cassette player operation such as stop, play, fast-forward, automatic search and rewind.

2. Description of the Prior Art

There are various conventional automatic mechanisms by which components such as a head base plate or a pinch roller for a tape cassette player can be moved to a position corresponding to a selected mode of operation such as a stop, play, fast-forward, automatic search and rewind. Such automatic mechanisms typically comprise a reversible electric control motor as disclosed for example in a patent to Nakamichi et al. U.S. Pat. No. 4,272,792. In such mechanisms, operating members for moving the components are actuated by cam means which is rotated in accordance with the rotation of the electric control motor. A U.S. patent application of Takamatsu Serial No. 06/506,664, filed June 22, 1983, subsequently and allowed and issued as U.S. Pat. No. 4,638,386, assigned to the assignee of the present invention, discloses sequential control of a plurality of members, for example a cassette pulling member and a cassette holder member, by means of separate cams which are rotated by the same motor.

However, in the prior art a plurality of motors are required for loading and ejecting a tape cassette and controlling the operation of a cassette player in all its modes.

OBJECTS AND SUMMARY OF THE INVENTION

An object of the invention is to provide, in a tape cassette player, an automatic mechanism that makes it possible sequentially and reversibly to control the loading of a cassette into the cassette player, the ejection of the cassette from the cassette player, and the operation of the cassette player in all its modes.

More particularly, an object of the invention is to provide, in a tape cassette player, a simplified automatic mechanism for controlling the movements of a cassette puller, a cassette holder and a head base plate.

Another object of the invention is to provide such an automatic mechanism which is controlled by a single reversible motor.

Another object of the invention is to provide such an automatic mechanism which is relatively compact and easily assembled.

In accordance with one aspect of this invention, an automatic control mechanism for a tape cassette player comprises a control motor selectively rotatable in first and second directions; a cassette holder movable between a cassette load/eject position and a cassette operating position; plate means movable to any of a plurality of positions respectively enabling operation of the cassette player in a plurality of modes; first, second and third cam means connected to the motor and mounted for reversible rotation thereby; a first operating member connected to and reversibly moved by the first cam means for effecting movement of a tape cassette within the cassette holder between an ejected position and a loaded position; a second operating member connected to the second cam means and the cassette holder and reversibly moved by the second cam means for effecting movement of the cassette holder between the cassette load/eject position and the cassette operating position; and a third operating member connected to the third cam means and the plate means and reversibly moved by the third cam means for effecting movement of the plate means to a selected one of the plurality of positions; the first, second and third operating members being moved in a sequence which depends on the direction of rotation of the motor.

BRIEF DESCRIPTION OF THE DRAWINGS

The preceding and other objects, features and advantages of the present invention will become apparent from the following detailed description of a preferred embodiment thereof, which is to be read in connection with the accompanying drawings.

FIG. 4 is a schematic plan view of three cam members and three operating members respectively controlled thereby, illustrating their relationship at each of four angular positions of the cam members; and FIG. 5 is a schematic plan view of patterns on a printed circuit board and the operating spheres of each of the three operating members, corresponding to the angular positions of the cam members.

DESCRIPTION OF A PREFERRED EMBODIMENT

Figure 1:
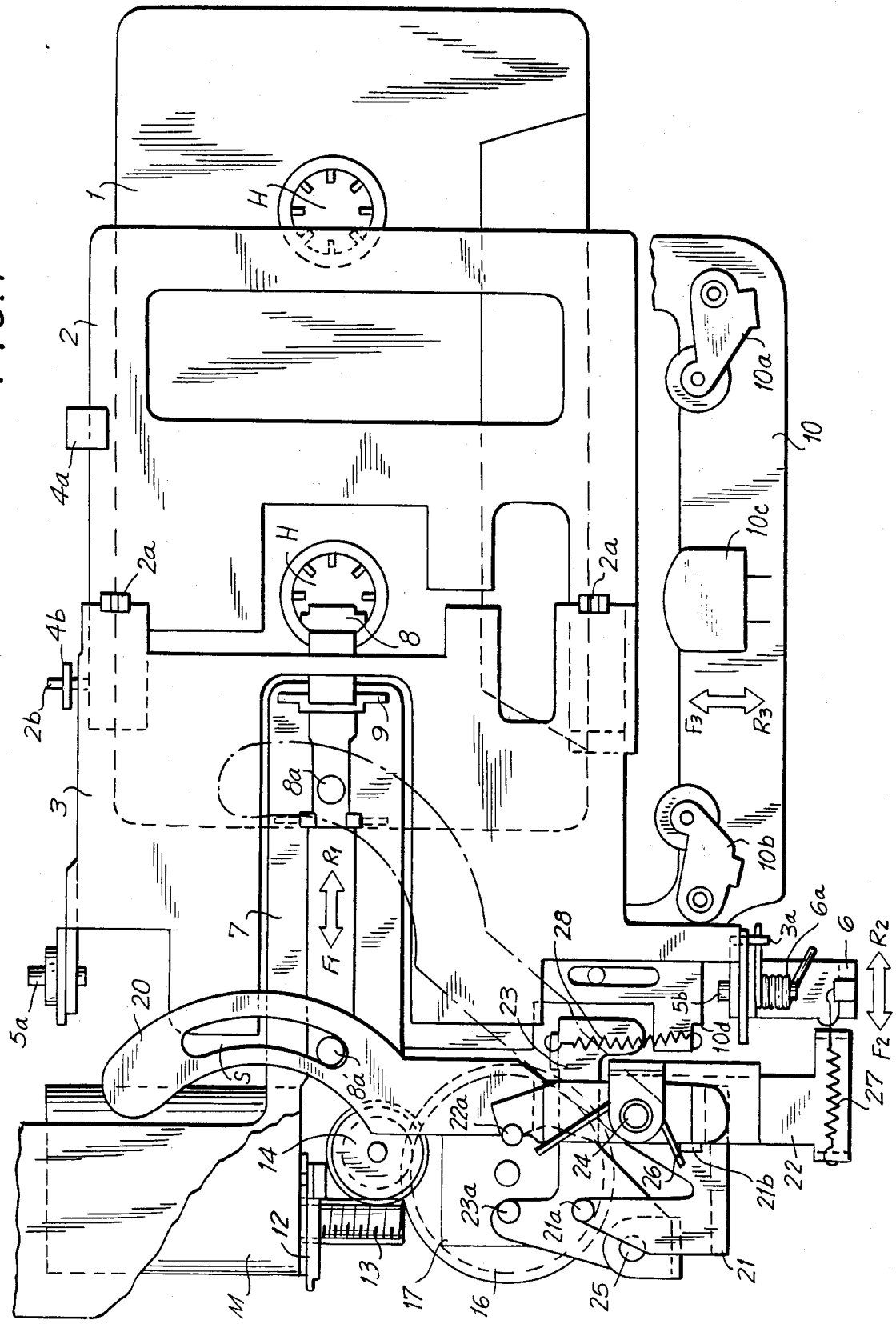
FIG. 1 is a schematic top plan view of a preferred embodiment of an automatic mechanism constructed in accordance with the invention.

FIG. 1 shows a tape cassette 1 partly inserted into a cassette holder 2 which is pivotally mounted below the lower surface of the distal end of an elevating drive plate 3 by means of hinges 2a (see also FIG. 3). Vertical movement of the cassette holder 2 is limited by a height regulating member 4a connected to and extending from a chassis. A pin 2b which extends horizontally is fixed to one side of the cassette holder 2 and inserted into a slot formed in a vertical guide wall 4b which extends upwardly from the chassis.

The elevating drive plate 3 is mounted for rotation about a horizontal axis defined by a pair of pivot pins 5a, 5b which are secured at a predetermined height above the chassis. The elevating drive plate 3 is thus adapted to raise the cassette holder 2 to the cassette load/eject position as shown in solid outline in FIG. 3 or lower it to the cassette operating position as shown in broken outline. A pin 3a extends horizontally from a vertical flange 3b formed at one side of the elevating drive plate 3 and is engaged from underneath by one end of a coil spring 6a. The coil spring 6a is mounted around the pin 5b, and the other end of the coil spring 6a engages the lever 6. The spring 6a generates sufficient counterclockwise torque (FIG. 3) about the pivot axis 5a, 5b to raise the cassette holder 2 to the upper cassette load/eject position shown in FIG. 3 under the condition described below and maintain it in contact with the height regulating member 4a (FIG. 1).

A subchassis 7 (FIG. 1) extends longitudinally at a predetermined height, and a cassette moving member 8 for engaging one of a pair of reel shaft insertion holes H formed in the tape cassette 1 is movable horizontally in either of the directions indicated by the two-headed arrow $F_1$-$R_1$. The cassette moving member 8 moves under the control of a swing arm 20 along a guide groove formed in the subchassis 7. A leaf spring 9 is fixed to the subchassis 7 for elastically pressing down on the distal end of the cassette moving member 8.

A pair of pinch rollers 10a and 10b and a reproducing magnetic head 10c are arranged on a head base plate 10 which is mounted on the chassis and movable in either of the directions indicated by the two-headed arrow $F_3$-$F_3$.

A control motor M (FIGS. 1 and 2) is selectively driven in a first or second direction of rotation and is mounted on the chassis for providing the the driving power to pull and push the tape cassette 1 so that it moves within the cassette holder 2 between an ejected position and a loaded position, elevate and lower the cassette holder 2 so that it moves between the cassette load/eject position and a cassette operating position, and move the head base plate 10 forward and backward to a selected one of a plurality of positions respectively enabling operation of the cassette player in a plurality of modes.

Figure 2:
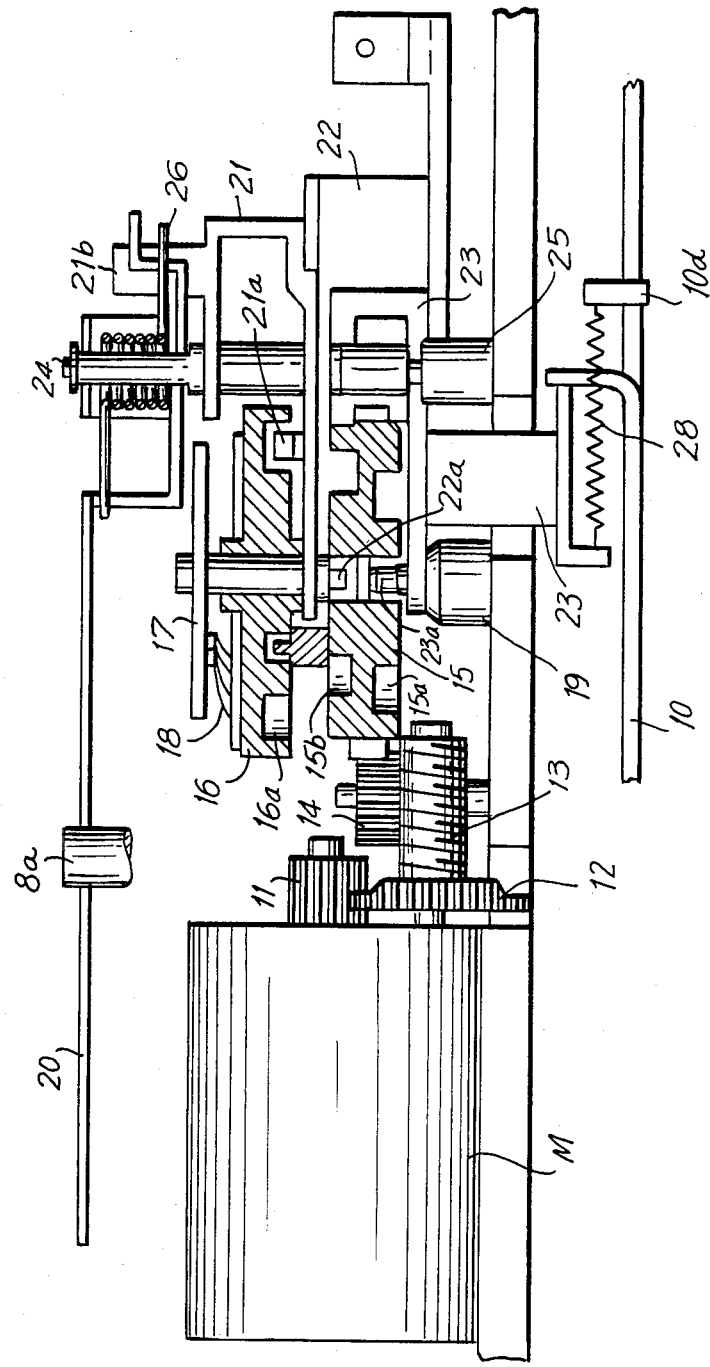
FIG. 2 is a schematic view, partly in section, of the mechanism of FIG. 1, and looking in the direction of arrow $R_1$ in FIG. 1.

As FIGS. 1 and 2 show, an output gear 11 which is fixed to the rotor axle of the motor M rotates a worm wheel or driving gear 14 through an intermediate gear 12 (which engages and is driven by the gear 11) and a worm 13 (which is coaxial with and driven by the gear 12 and engages and drives the gear 14).

A first disk 15 having peripheral gear teeth is formed with grooved cams 15a and 15b in the lower and upper planar surfaces thereof, respectively. The disk 15 is mounted for rotation on a vertical axle 19. A second disk 16 is also mounted for rotation on the axle 19. The disks 15 and 16 are rigidly connected together and rotate as a unit. The disk 16 is formed with a grooved cam 16a in the lower planar surface thereof.

A printed circuit board 17 (FIG. 2) having circuit patterns (FIG. 5) printed on the lower planar surface thereof is mounted in a fixed position above the second disk 16. A pair of brush springs 18 fixed on the upper surface of the second disk 16 extend upward to make resilient contact with the circuit board 17. As the second disk 16 rotates, the brush springs 18 move along the length of the printed patterns of FIG. 5, so that output signals are generated which are indicative of the angular positions of the first and second disks 15 and 16 corresponding to the different functions and operating modes of the cassette player.

The swing arm 20 (FIGS. 1, 2 and 4) has an elongated slot S (FIG. 1) into which a pin 8a is inserted. The swing arm 20 is rotatably mounted on a vertical axle 24. A first operating member or arm 21 (FIGS. 1, 2 and 4) is also rotatably mounted on the axle 24. A coil spring 26 mounted on the axle 24 bears against a projection 21b of the first operating member 21 so that the member 21 makes continuous contact with swing arm 20. The operating member 21 thus controls the movement of the swing arm 20 and, through the slot 5 and pin 8a, also controls the movement of the cassette moving member 8. Movement of the operating member 21 therefore causes movement of the tape cassette 1 within the cassette holder 2 between an ejected position shown in FIG. 1 and a loaded position shown in FIG. 3.

A second operating member or arm 22 (FIGS. 1, 2 and 4) for reversibly moving the cassette holder 2 between the cassette load/eject position (shown in solid outline in FIG. 3) and the cassette operating position (shown in broken outline in FIG. 3) is also rotatably mounted on the axle 24.

A third operating member or arm 23 (FIGS. 1, 2 and 4) for reversibly moving the head base plate forward and backward to one of a plurality of positions respectively enabling operation of the cassette player in one of a plurality of modes is rotatably mounted on an axle 25 which is spaced apart from and parallel to the axle 24.

The first, second and third operating arms 21, 22 and 23 are respectively provided with pins or cam-followers 21a, 22a, 23a (FIGS. 1, 2 and 4) at ends thereof remote from the shafts 24, 25 on which the arms are respectively mounted. The pins 21a, 22a and 23a are respectively inserted into the grooved cam 16a, which is formed in the second disk 16, and the cams 15b, 15a, which are formed in the first disk 15. The pins 21a, 22a and 23a are moved in the radial direction of the disks 15, 16 in accordance with the rotation of the disks as shown in FIG. 4. By the cooperation of grooved cams 16a, 15b, and 15a with the first, second and third operating arms 21, 22 and 23, respectively, three different reciprocal and substantially linear motions in three different directions are independently established in accordance with the rotation of the disks 16, 15.

Figure 3:
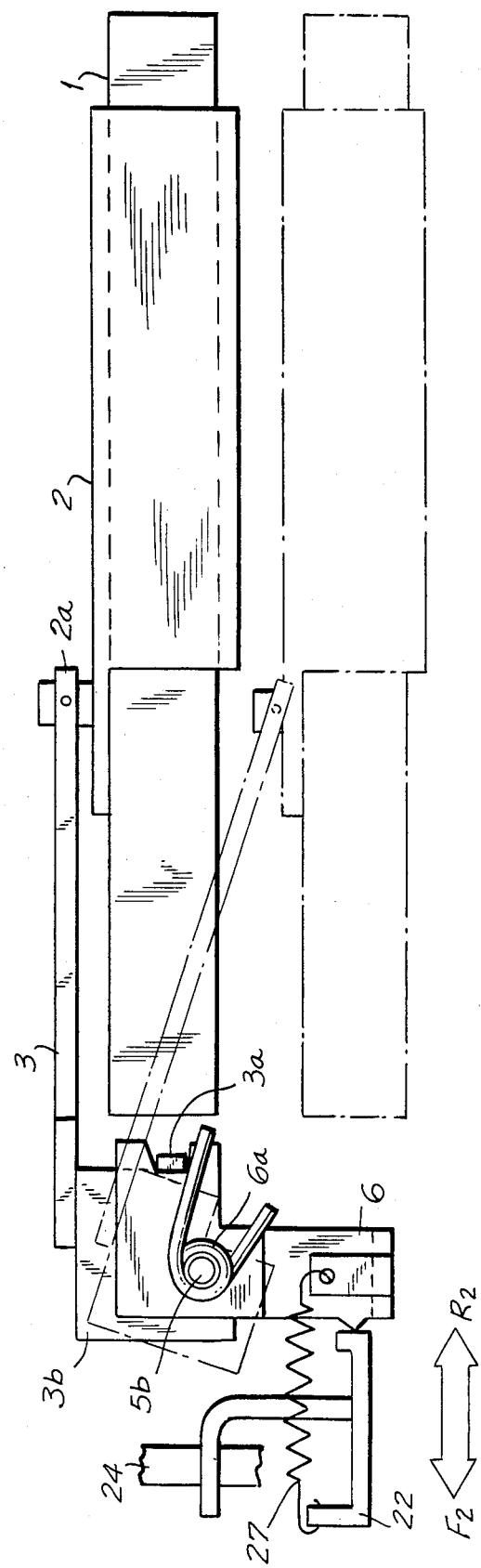
FIG. 3 is a schematic elevational view of the mechanism of FIG. 1 illustrating the vertical movement of a portion thereof, and looking in the direction of arrow $F_3$ in FIG. 1.

FIG. 3 shows the connections between the second operating arm 22, the pivot lever 6, the elevating drive plate 3 and the cassette holder 2. One end of the pivot lever 6 is biased into contact with the second operating arm 22 by a tension spring 27. The pin 3a of the elevating drive plate 3 is biased into contact with the other end of lever 6 by the spring 6a. Thus, as shown by a solid line in FIG. 3, the elevating drive plate 3 is urged to rotate in the counterclockwise direction until the pin 3a makes contact with the upper end of the pivot lever 6. This lifts the cassette holder 2 through the hinges 2a. When the second operating arm 22 moves in the direction of arrow F2, under the control of the cam groove 15b, the pivot lever 6 and elevating drive plate 3 rotate clockwise, so that the tape cassette 1 in the cassette holder 2 is moved to its operating position, shown by dotted lines in FIG. 3.

The third operating arm 23 is urged into contact with an extended portion 10d of the head base plate 10 by a tension spring 28, as shown in FIG. 1. The head base plate 10 is urged to move forward (in the direction of the arrow F3) by a separate spring (not shown).

The operation of the automatic mechanism of the invention is as follows:

When the tape cassette 1 is partly inserted into the cassette holder 2, as shown in FIG. 1, the cassette moving member 8 engages one of the reel shaft insertion holes H. At this time the swing arm 20, which engages the pin 8a of the cassette moving member 8, remains in its ejecting position, as shown by dotted lines in FIG. 1.

If an operating button such as PB (FIG. 5) is depressed in order to institute (for example) the playback mode, the control motor M begins to rotate, thereby rotating the first and second disks 15 and 16 through the output gear 11, intermediate gear 12, worm 13 and driving gear 14.

The configurations of the three grooved cams 16a, 15b and 15a are shown in FIG. 4, and the movements of these cams 16a, 15b and 15a and the three operating arms 21, 22, and 23 are clearly illustrated as functions of the rotation of the disks 16 and 15 to four different angular positions (substantially 0°, 90°, 180° and 270°).

When the first and second disks 15 and 16 are rotated in the direction of the arrow R by the control motor M from the 0° position to the 90° position, only the first operating arm 21 is moved. It rotates around the axle 24 in the direction of the arrow A so that the swing arm 20 moves from the ejecting position shown in dotted outline in FIG. 1 to the load position shown in solid outline in FIG. 1 to pull the tape cassette 1 fully into the cassette holder 2.

Even though, at the same time, the first disk 15 is also rotated in the direction of the arrow R, the second and third operating arms 22, 23 are not rotated at all because the radii of the two grooved cams 15b and 15a do not change between the 0° and 90° positions.

When the first and second disks 15 and 16 are rotated farther in the same direction by the control motor M from the 90° position to the 180° position only the second operating arm 22 is moved. The arm 22 rotates around the axle 24 in the direction of the arrow B so that the pivot lever 6 rotates around the pivots 5a, 5b in the direction of the arrow F2 shown in FIG. 3. This rotates the elevating drive plate 3 clockwise, which moves the cassette holder 2 from the load/eject position shown in solid outline to the operating position shown in broken outline. The holes H in the tape cassette can then be engaged by corresponding reel shafts (not shown) of the cassette player.

Even though, at the same time, both of the grooved cams 16a and 15a rotate from the 90° position to the 180° position, the first and third operating arms 21 and 23 are not rotated at all because the radii of the grooved cams 16a and 15a do not change between the 90° and 180° positions.

If the disks 15 and 16 are rotated still farther in the same direction by the control motor M through an additional angle which is variable and may range up to 180° (i.e., the total angle of rotation may range up to 360°), only the third operating arm 23 is moved. It rotates around the axle 25 in the direction of the arrow C. By means of the connecting spring 28, this causes the head base plate 10 to move forward (in the direction of the arrow F3) to one of a plurality of positions respectively enabling operation of the cassette player in a plurality of modes. At this time, the first and second operating arms 21 and 22 are not rotated at all because the radii of the grooved cams 16a and 15b do not change during the additional rotation beyond 180°.

In one embodiment of the invention, the head base plate 10 is positionable in any of three different positions respectively corresponding to different modes of which the cassette player is capable. In the stop, fast-forward and rewind modes of the cassette player, the head base plate 10 is moved to a first position where both the magnetic head 10c (FIG. 1) and the pair of pinch rollers 10a and 10b are well spaced apart from the magnetic tape.

In the automatic search mode of the cassette player, the head base plate 10 is moved to a second position where the magnetic head 10c lightly contacts the magnetic tape and both of the pinch rollers 10a and 10b are well spaced apart from the magnetic tape. In this mode, a blank or non-recorded portion of the tape, or a portion of the tape in which a control signal having a low frequency such as 5 or 10 HZ is recorded, is scanned quickly.

In the playback mode of the cassette player, the head base plate 10 is moved to a third position where both the magnetic head 10c and one of the pinch rollers 10a or 10b engage the magnetic tape. As indicated below in a discussion of FIG. 5, the positions of the base plate 10 are determined by the rotary angle of the disks between 180° and a maximum angle which may range up to 360° but is preferably limited to substantially 300°.

As in conventional cassette players, reel driving gears for fast-forward, rewind and playback modes are automatically changed in accordance with the movement of the head base plate 10, and automatic reverse mechanisms for changing the pinch rollers and a pair of reel driving gears are controlled by the driving directions of a reversible capstan motor (not shown).

If the eject button (shown schematically in FIG. 5) of the cassette player is depressed during, for example, the playback mode, the automatic mechanism of the invention operates as follows:

First, when the disks 15 and 16 are rotated by the control motor in the clockwise direction in FIG. 4 (opposite the direction of the arrow C) from a position beyond the 180° position to the 180° position, the third operating arm 23 rotates clockwise and moves the head base plate 10 backward (in the direction of the arrow $R_3$ in FIG. 1) so that magnetic head 10c and the pinch rollers 10a and 10b are well spaced apart from the magnetic tape.

Second, after the backward movement of the head base plate 10 is completed, the disks 15 and 16 rotate from the 180° position to the 90° position. This rotates the second operation arm 22 in the counterclockwise direction (opposite the direction of the arrow B) so that the cassette holder 2 is lifted by the elevating drive plate 3 from its cassette operating position to its load/eject position.

Third, in response to the additional rotation of the disks 15 and 16 from the 90° position to the 0° position, the first operating arm 21 is rotated clockwise (opposite the direction of the arrow A) so that the swing arm 20 moves from the loading position to the ejecting position and the cassette moving member 8 moves to the right (FIG. 1) and ejects the tape cassette 1 from the cassette holder 2.

FIG. 5 shows contacts $S_0$, $S_1$, $S_2$, $S_3$, $S_4$, $S_5$, and $S_6$ forming a printed pattern the circuit board 17. It also shows schematically the function buttons PB, AUTO, FF/REW, LOAD and EJECT. The function buttons are represented adjacent to the pairs of contacts $S_0$ through $S_6$ respectively corresponding thereto. Brush springs 18 are moved in the direction of the arrow 1 or m in accordance with the direction of rotation of the disk 16 and complete different circuits, for example $S_0$ and $S_1$ for EJECT or $S_2$ and $S_6$ for PB, at the different rotary angles of the disk 16 to generate different output signals which are supplied to a control circuit (not shown) so that the control motor M is controlled to rotate in a given direction and stop when the corresponding output signal is generated in response to the selected mode of the cassette player. FIG. 5 also shows that the operating arms 21, 22 and 23 are controlled to move in response to rotation of the disks through different angular sectors.

Independent movements for moving the tape cassette, cassette holder, and movable components such as a head base plate are thus sequentially controlled in accordance with the rotation of the motor in each direction.

Many modifications of the preferred embodiment of the invention disclosed above will readily occur to those skilled in the art upon consideration of this disclosure. Accordingly, the invention includes all structure which is within the scope of the appended claims.

What is claimed is:

1. An operation changing mechanism for a tape cassette player comprising:

a reversible control motor selectively rotatable in first and second directions;

a cassette holder movable between a cassette load-/eject position and a cassette operating position;

a head plate movable to any of a plurality of positions respectively enabling operation of said cassette player in a plurality of modes;

first, second and third separate cam means mechanically linked to said motor and mounted for reversible rotation thereby;

a first operating member connected to and reversible moved by said first cam means for effecting reversible movement of a tape cassette within said cassette holder between an ejected position and a loaded position;

a second operating member connected to said second cam means and said cassette holder and reversibly moved by said second cam means for effecting movement of said cassette holder from said cassette load/eject position to said cassette operating position and reversibly back to the load/eject position; and a third operating member connected to said third cam means and said head plate and reversibly moved by said third cam means for effecting reversible movement of said head plate to a selected one of said plurality of positions;

said first, second and third operating members being moved in a sequence which depends on the direction of rotation of said motor.

2. A mechanism according to claim 1; wherein:

for rotation of said motor in said first direction, said tape cassette first moves from said ejected position to said loaded position, said cassette holder then moves from said cassette load/eject position to said cassette operating position, and said head plate then moves from an initial position to said selected position; and for rotation of said motor in said second direction, said head plate first moves from said selected position to said initial position, said cassette holder then moves from said cassette operating position to said cassette load/eject position, and said tape cassette then moves from said loaded position to said ejected position.

3. A mechanism, according to claim 2; wherein said selected position of said head plate corresponds to a particular angular position of said third cam means.

4. A mechanism according to claim 1; wherein said first, second and third cam means are rigidly connected together and rotate as a unit.

5. A mechanism according to claim 4; wherein said movement of said tape cassette from said ejected position to said loaded position corresponds to rotation of said first, second and third cam means from a first angular position of 0° to a second angular position of substantially 90°, said movement of said cassette holder from said cassette load/eject position to said cassette operating position corresponds to rotation of said first, second and third cam means from said second angular position to a third angular position of substantially 180°, and said movement of said head plate to said selected position corresponds to rotation of said first, second and third cam means to a fourth angular position ranging up to substantially 300°.

* * * * *